United States Patent
Gutjahr et al.

(10) Patent No.: US 8,464,279 B2
(45) Date of Patent: Jun. 11, 2013

(54) DOMAIN EVENT CORRELATION

(75) Inventors: Bernd Gutjahr, Boeblingen (DE); Martin Bosler, Boeblingen (DE); Frank Vosseler, Boeblingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 453 days.

(21) Appl. No.: 12/641,876

(22) Filed: Dec. 18, 2009

(65) Prior Publication Data

US 2011/0154367 A1 Jun. 23, 2011

(51) Int. Cl.
G06F 3/00 (2006.01)
G06F 9/44 (2006.01)
G06F 9/46 (2006.01)
G06F 13/00 (2006.01)
G06F 11/00 (2006.01)
G06F 15/173 (2006.01)

(52) U.S. Cl.
USPC .............. 719/318; 714/25; 714/26; 709/223; 709/224

(58) Field of Classification Search
USPC .......... 709/223, 224, 226; 719/318; 718/100; 702/182, 183, 84, 185
See application file for complete search history.

(56) References Cited

U.S. PATENT DOCUMENTS

| | | | |
|---|---|---|---|
| 5,493,729 A * | 2/1996 | Nigawara et al. | 706/52 |
| 5,732,192 A | 3/1998 | Malin et al. | |
| 6,006,016 A * | 12/1999 | Faigon et al. | 714/48 |
| 6,629,106 B1 * | 9/2003 | Narayanaswamy et al. | 1/1 |
| 6,941,557 B1 * | 9/2005 | Jakobson et al. | 719/316 |
| 7,337,090 B1 * | 2/2008 | Yemini et al. | 702/183 |
| 2005/0137832 A1 * | 6/2005 | Yemini et al. | 702/183 |
| 2005/0222811 A1 * | 10/2005 | Jakobson et al. | 702/183 |
| 2006/0041659 A1 * | 2/2006 | Hasan et al. | 709/224 |
| 2006/0070128 A1 * | 3/2006 | Heimerdinger et al. | 726/23 |
| 2006/0167689 A1 * | 7/2006 | Maren | 704/240 |
| 2007/0074076 A1 * | 3/2007 | Imai et al. | 714/26 |
| 2007/0174449 A1 * | 7/2007 | Gupta | 709/224 |
| 2008/0114581 A1 * | 5/2008 | Meir et al. | 703/13 |
| 2008/0114874 A1 * | 5/2008 | Meir et al. | 709/224 |
| 2008/0126858 A1 * | 5/2008 | Barras | 714/25 |
| 2008/0177756 A1 * | 7/2008 | Kosche et al. | 707/100 |
| 2008/0209254 A1 * | 8/2008 | Bailey et al. | 714/2 |
| 2009/0292948 A1 * | 11/2009 | Cinato et al. | 714/26 |
| 2010/0131891 A1 * | 5/2010 | Firminger et al. | 715/810 |
| 2010/0332911 A1 * | 12/2010 | Ramananda et al. | 714/45 |

* cited by examiner

*Primary Examiner* — Emerson Puente
*Assistant Examiner* — Charles Swift

(57) ABSTRACT

A system is provided for dynamically identifying and correlating network domain events. The system includes a network domain and a plurality of managed objects in the network domain. A management server is in communication with the managed objects. The management server can receive domain events from at least one of the managed objects. A management module on the management server maintains a topology of managed objects in the network domain. A rule knowledge base is in communication with the management server. The rule knowledge base includes correlation rules for identifying and correlating domain events. A correlation module utilizes a processor to correlate the domain events with the topology using the correlation rules to identify an interaction between the managed objects and the domain events.

20 Claims, 3 Drawing Sheets

DOMAIN EVENT CORRELATION

BACKGROUND

Businesses and organizations use Information Technology (IT) systems in the operation and management of the business. The delivery of IT business services often involves software applications, middleware, storage, system infrastructure and other managed objects that are closely connected. A problem in one domain can cause multiple failures in other domains, leading to many events about issues that may trigger uncoordinated actions in multiple teams. Businesses attempt to quickly identify the root cause of system failures and ensure that the right team starts fixing the problem as soon as possible.

IT management applications often use event correlation technologies to filter and process incoming events and assist in the identification of relevant events. Root cause analysis can be a competitive differentiator between management software vendors. However, many existing correlation systems are limited to using the information that is contained in the event attributes to identify relevant events. However, current correlation system cannot easily detect or identify causal relationships between events that are originating from different infrastructure elements. To detect and identify causal relationships between events in current systems often involves hard-coding an IT topology into correlation rules to represent how particular instances of managed objects are related to one another. For example, a rule in such a correlation system may define that a quota problem on logical volume instance "LV-ESS-1" may cause an extension problem on tablespace "TS-ESS-1". The rule includes information on the related infrastructure elements of the managed environment. The inclusion of this information in the rules can lead to significant costs in maintaining the rules. Further, such an approach is not flexible enough to allow efficient handling of infrastructure changes that occur in the domain. Some systems involve virtualized IT environments which may undergo significant and/or frequent changes. Building correlation rules to address such a system can be time consuming and may be difficult to accomplish under current systems. Often businesses use event correlation specialists to address system correlation issues, which further increases the cost.

Accordingly, businesses desire the ability to quickly identify root causes of system failures in order to quickly begin addressing the failures while reducing the time, cost, and complexity of causal analysis systems. There is a desire for a system capable of correlating events in a way that is more easily adaptable to a dynamic IT environment and is also maintainable with minimum effort by domain experts rather than correlation specialists.

DETAILED DESCRIPTION OF EXAMPLE EMBODIMENT(S)

Figure 1:
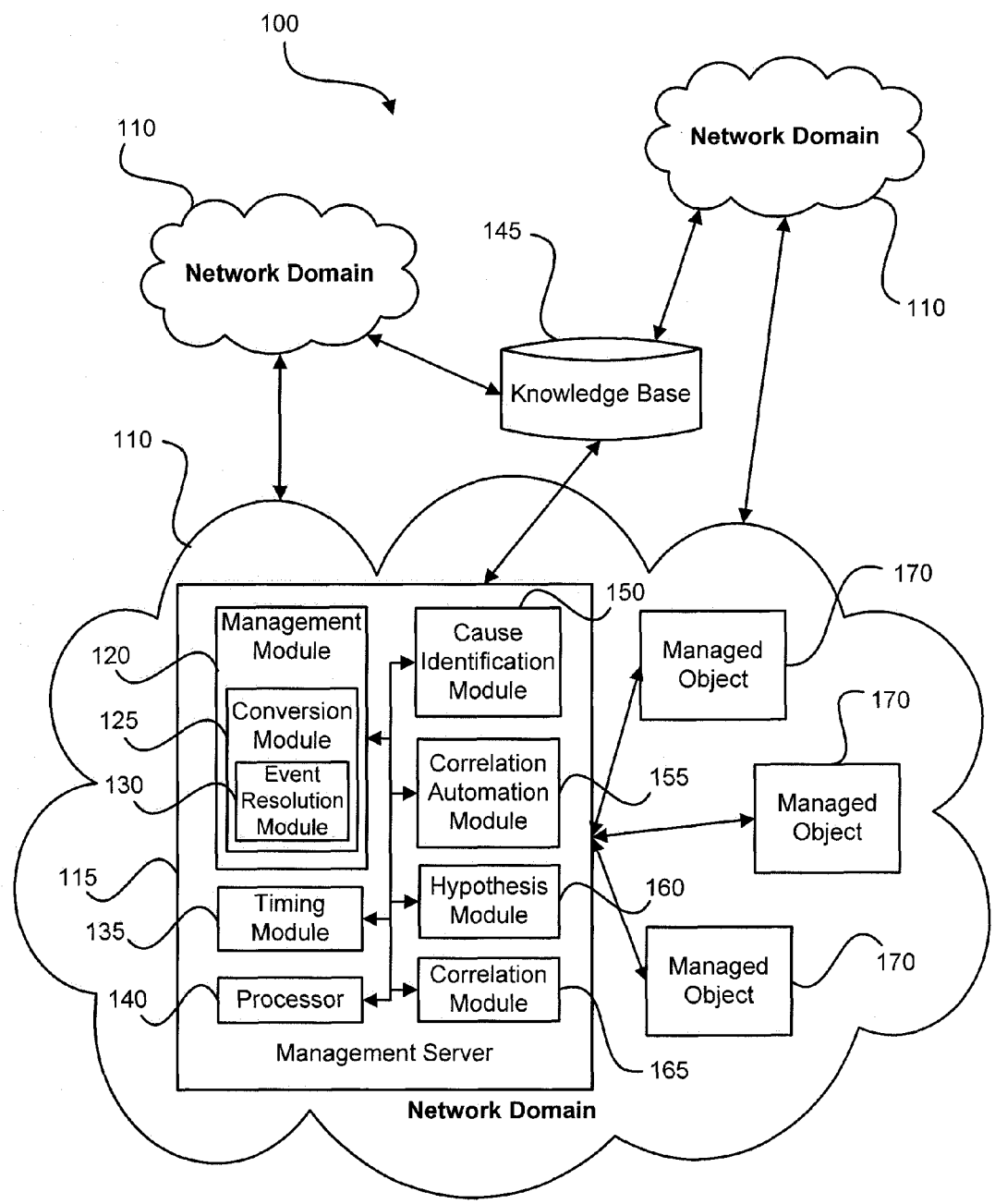
FIG. 1 is a block diagram of a system for dynamically identifying and correlating network domain events in accordance with an embodiment.

Reference will now be made to the exemplary embodiments illustrated, and specific language will be used herein to describe the same. It will nevertheless be understood that no limitation of the scope of the invention is thereby intended. Additional features and advantages of the invention will be apparent from the detailed description which follows, taken in conjunction with the accompanying drawings, which together illustrate, by way of example, features of the invention.

In describing and claiming the present invention, the following terminology will be used in accordance with the definitions set forth below.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, "domain" or "IT domain" is used to refer to a network made up of a group of clients, servers, devices, software, and so forth. In some embodiments, devices sharing a common part of an address, or URL (Uniform Resource Locator), may be considered as being in the same domain. The term "domain" may also be broadly used to encompass systems or fields of study involving terminology, functionality, devices, etc. for a software program constructed to solve a problem in the area of computer programming.

As used herein, "information technology" (IT) is used to refer to the study, design, development, implementation, support or management of computer-based information systems, and may relate to software applications and computer hardware. IT can involve the use of electronic computers and computer software to convert, store, protect, process, transmit, and securely retrieve information. An IT architecture can be an integrated framework for acquiring and evolving IT to achieve strategic goals and may include both logical and technical components. Logical components may include mission, functional and information requirements, system configurations, and information flows. Technical components may include IT standards and rules that will be used to implement the logical architecture.

Current IT environments can be complex. Due at least in part to this complexity, event correlation and root cause analysis can be valuable in management systems for businesses. The dynamics of data centers and distributed applications can pose challenges to event correlation and root cause analysis technologies. Some current approaches to causal event identification in IT infrastructures involve using event-stream processing or complex event-processing technology. These technologies can be effective, but are capable only of correlating information contained within particular streams of events. As such, these technologies can be useful in reducing "noise" before feeding the events into a different causal analysis engine. Furthermore, these technologies are not easily configurable by domain experts. Other approaches require pre-compiling causal symptom relations on network objects and are not easily applicable in dynamic environments. These approaches can be highly complex, difficult to configure, and involve a multitude of additional systems to be maintained by a customer.

To address challenges and shortcomings of previous systems, a system for dynamically identifying and correlating domain events is described. The system includes a domain and a plurality of managed objects in the domain. A management server is in communication with the managed objects. The management server can receive domain events from at least one of the managed objects. A management module on the management server maintains a topology of managed objects in the network domain. A rule knowledge base is in communication with the management server. The rule knowledge base includes correlation rules for identifying and correlating domain events. A correlation module utilizes a processor to correlate the domain events with the topology using the correlation rules to identify an interaction between the managed objects and the domain events.

Illustrated in FIG. 1 is a system 100 for identifying and correlating network domain events in accordance with an embodiment. The system can use causal and topology models in such a way that domain events from different sources—even from different domains—can be used to identify causes of failures across domains. The system can dynamically adjust, even at runtime, to topology changes in a network domain. The system is also configurable to hide the complexity of causal rule language to enable domain experts to use and manage the system as opposed to a more common approach of using correlation technology experts.

The system 100 includes a management server 115 and a plurality of managed objects 170. The management server and the plurality of managed objects can be in communication with one another and may reside in one or more network domains 110. In some embodiments, the system can include multiple network domains which may be interconnected. The management server can be used to manage a single network domain or multiple network domains. The managed objects can be managed by the management server. The managed objects can comprise any variety of devices or software. Examples of managed objects include servers, workstations, printers, processors, hard drives, file systems, databases, applications and so forth. Many other types of managed objects are also contemplated. Virtually any object within a network domain, whether hardware, software, or firmware, and which is capable of being managed by a management server may be considered a managed object. The managed objects can also include virtual objects. For example, a server running on a virtual machine may be a managed object.

The managed objects 170 can be configured create an event, or domain event. As used herein, the terms "event" and "domain event" are used to describe an action or occurrence or a notification of an action or occurrence which may generally be outside of the scope of expected functionality of a managed object. For example, an event may result from a device failure, a software malfunction, an unexpected user interaction with a system, etc. Although the following discussion of the system may generally refer to events in terms of a failure or a system, device, software, etc. for simplicity, limitation of scope of the term "event" to failures is not intended. The managed objects can be configured to send domain events to the management server 115. The management server can be configured to receive the domain events from managed objects.

The management server 115 can include a management module 120. The management module can be configured to maintain a topology of managed objects 170 in one or more network domains. In one aspect, the topology can be a model of the one or more network domains 110 which includes elements of IT infrastructure in the domain, applications, networks, storage, etc. The topology can also include the relationships among the various items included in the topology. In one aspect, the management module can be a part of or in communication with a software management application. The management module can be useful in assisting network administrators in viewing and managing conditions in a computer network or domain. The management module can "discover" devices that are in the network domain and show relative location and status of the devices.

In one aspect, the management module can be or include a configuration management database (CMDB) or other form of data repository. A CMDB is a repository of information related to all the components of an information system. The management module can use the CMDB in maintaining the topology. The CMDB can include an authorized configuration of the components of the IT environment. The CMDB can help an organization understand the relationships between managed objects and track managed object configurations. The CMDB can record configuration items (CI) and details about attributes and relationships between CIs. CIs can be described in terms of various configurable attributes. Some examples of attributes include: technical, ownership, relationship, etc. These attributes can be used to describe technical features or ownership of managed objects, and relationships among the managed objects. The management module can use a CMDB to automatically discover information about the CIs and track network or managed object changes as the changes happen.

The management server 115 can include a conversion module 125. In one aspect, the conversion module can be on or a part of the management module 120. The conversion module can be configured to convert domain events of various formats into a uniform event indicator format. Because different event sources or management applications (e.g., managed objects) may provide event information in different formats, the conversion module can be used to convert the event information into a uniform format which can more easily be referenced with regards to the topology or correlation rules which will be discussed below. Often times, event information from different sources can include the same information yet be reported in markedly different manners. Converting domain events into a uniform format can simplify the creation and management of the system. The conversion module can access an event conversion database configured to store event reporting formats for various managed objects in the network domain along with corresponding uniform event indicators so that the conversion module can access the database to perform the conversion.

In one aspect, the uniform event indicator format is an Event Type Indicator (ETI) which represents the information contained in an event in a more abstract form, such as an enumeration of 1 to n possible values. The ETI can be related to a CI type. For example, CI type 'Logical Volume' may have an ETI 'Quota' with values 'OK', 'at limit', and 'exceeded'. Abstracting various formats into a well-defined set of ETI values can enable a more manageable system which is independent of individual nuances of event reporting managed objects.

In one aspect, the conversion module 125 can further include an event resolution module 130. The event resolution module can be configured to analyze domain event properties and compare the domain event properties with the uniform event indicators to find a best-matching uniform event indicator when a perfect-matching uniform event indicator is not available. For example, when a new managed object 170 is introduced to one or more of the network domains 110, the event conversion database may not have conversion information available specifically for the new managed object. However, the event resolution module can compare event information with the available options in the event conversion database to determine a best fit for events from the new managed object. Once an appropriate conversion has been determined, the event conversion database can be updated to include the new managed object conversion information.

Also, the system can monitor causal analysis of events after determining the conversion to determine whether the conversion was appropriate and/or actually fit the event such that the event was resolved.

The system 100 can include a rule knowledge base 145. The rule knowledge base can be in communication with the management server. The rule knowledge base can be on the management server 115 or separate from the management server. In one aspect, the rule knowledge base can be in a separate domain from the management server. The rule knowledge base includes correlation rules. The correlation rules can be used in identifying and correlating domain events. Correlation rules can be defined on a class-level. Defining correlation rules on a class level can enable individual rules to be added or removed from the rule knowledge base (such as when a managed object is added or removed from the network domain) without re-compiling or re-writing all of the rules. The rules can be independently defined and multiple rules can be combined to correlate domain events.

In some embodiments the system 100 can include a correlation rule automation module 155. The correlation rule automation module can be configured to analyze domain event logs to detect clusters of domain events which repeatedly occur together. This information can then be used by the correlation rule automation module to automate or assist in definition of the correlation rules.

The correlation rules, together with the topology, can be used by a correlation module 165 on the management server 115 to identify an interaction between the managed objects 170 and the domain events. The correlation module can use a processor 140 to correlate the domain events with the topology by using the correlation rules. The correlation rules can associate a CI instance and an event with matching cause-symptom relations. The cause-symptom relations can be checked against topology constraints by a cause identification module 150 to establish a positive causal relationship between symptoms and causes. In other words, a cause of the domain events can be determined based on the interaction between the managed objects and the domain events as constrained by topological information.

In one aspect, the cause identification module 150 can be configured to correlate a plurality of domain event causes with the topology to identify a root cause. Oftentimes, though a domain event has occurred and a cause of that event has been determined, there may yet be an underlying root cause which is not easily identifiable by prior systems. Without being able to identify or resolve a higher level failure in a system, lower level failures may continue to occur. The cause identification module can use the rules from the rule knowledge base in connection with topology information from the CMDB to associate events together to create a clearer picture of causes and symptoms in the system to determine the root case.

In one embodiment, the cause identification module 150 can correlate domain events based on domain event occurrence information. This can be useful in correlating events to determine causes even if a time difference between otherwise relevant events is removed or delayed. Event occurrence information can be stored as time stamps within events.

In other embodiments, the cause identification module 150 can work together with a timer or timing module 135 to associate multiple domain events when the domain events occur within a predetermined time frame. For example, the correlation rules may include information about which domain events should be correlated depending on how closely together in time the domain events occur. If a second domain event occurs outside of a given time window from a first event, the second domain event may not be associated with the first domain event. If a second domain event does occur within the given time window from the first event, the second domain event may be associated with the first domain event. The association with the first domain event may determined solely based on timing of the events or may be determined by other factors as well. Examples of other factors include whether the first and second events both match a same correlation rule or whether the topology related to the first and second events matches the correlation rule.

Figure 2:
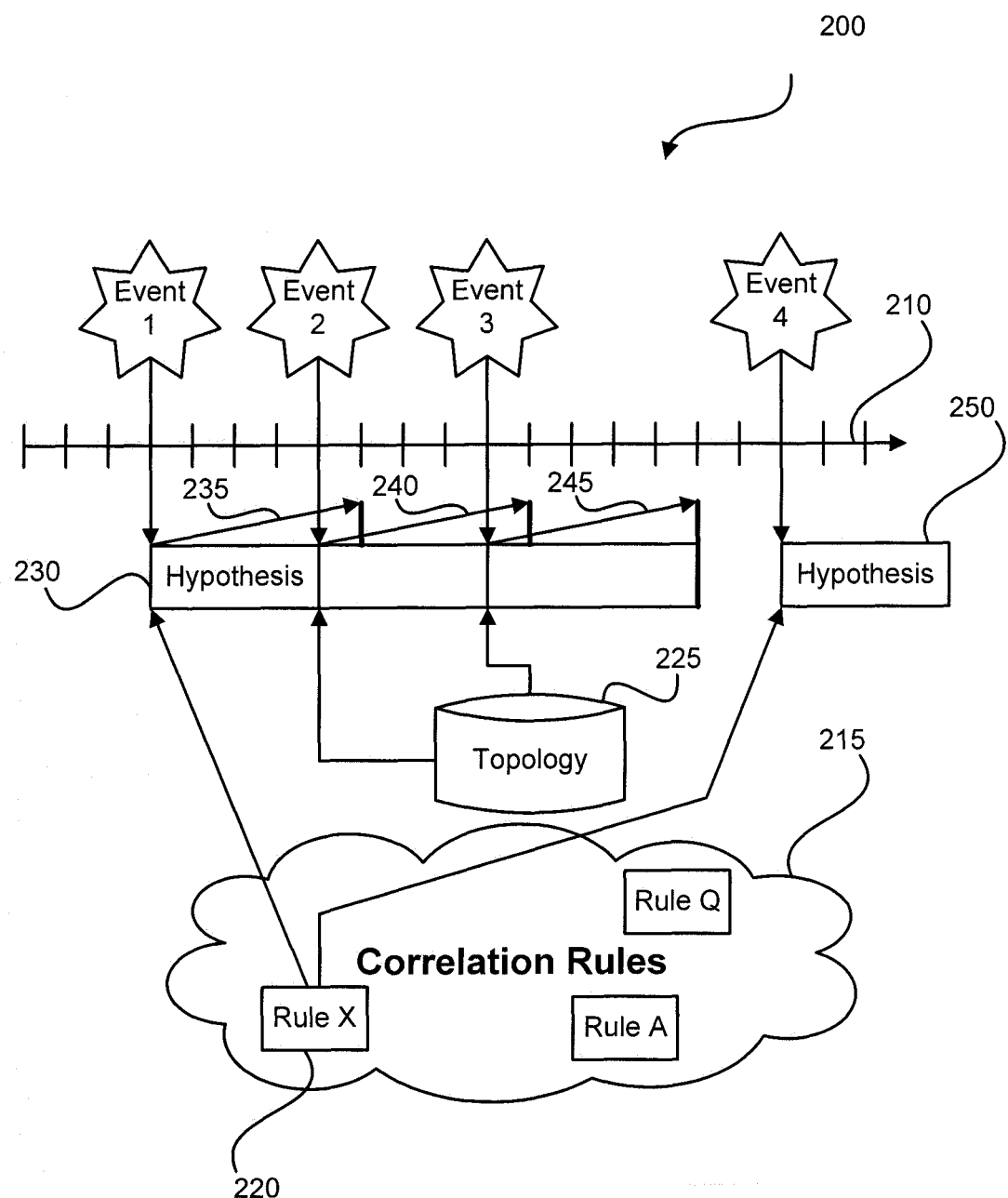
FIG. 2 is a block diagram of an event timing system in accordance with an embodiment.

The system 100 can further include a hypothesis module 160. The hypothesis module can be used with the cause identification module 150 to create a theory or hypothesis as to why an event occurred. In other words, the hypothesis module can be used to help determine possible causes or root causes of system failures. Reference will now be made to FIG. 2 in describing creation of a hypothesis in connection with receipt of events to help determine event causes.

FIG. 2 illustrates a series of events, labeled as Events 1-4 which occur over a time period illustrated by a timeline 210. When a first event, Event 1, is received by the management server, the correlation module can access a knowledge base of correlation rules 215 to determine whether there is at least one correlation rule corresponding to Event 1. When a correlation rule, such as rule x 220, is found which matches Event 1, a hypothesis 230 can be created by the hypothesis module to describe a possible cause of the event. When the hypothesis is created, or when Event 1 is received, an initial time window 235 can be created. The system can monitor whether other domain events occur within the initial time window. If a second event, Event 2, occurs within the initial time window, the correlation module can be used to determine whether the second event matches one or more of the correlation rules applicable to Event 1. If Event 2 does not match one or more of the correlation rules applicable to Event 1, Event 2 may not be correlated with Event 1 but instead be considered separately with a separate hypothesis, time window, etc. As shown in FIG. 2, if Event 2 does match one or more of the correlation rules applicable to Event 1, Events 1 and 2 can be correlated and the initial time window can be extended to create an extended time window 240. In determining whether to correlate Events 1 and 2, the topology 225 may also be consulted to ensure that the topology of Events 1 and 2 is consistent with the applicable correlation rule(s).

The extended time window can allow for additional events to be added to the hypothesis. The events can occur within a same domain or across different connected domains. As each domain occurs and is correlated with a previous event, a field of applicable correlation rules can be narrowed. Also, a field of applicable correlation rules can be narrowed when no additional events occur within a time window because certain possible symptom-cause relationships defined by the correlation rules may involve additional events which did not ultimately occur within the time window. Thus a hypothesis can change over time depending on whether or not later events are correlated with earlier events and depending on the nature of the events.

In FIG. 2, a third event, Event 3, is received within the extended time window 240 from Event 2. Because Event 3 matches the same correlation rule, rule x 220, as Events 1 and 2, and because the topology 225 of the three events is consistent with rule x, Event 3 has been correlated with Events 1 and 2. The time window is again extended to create a third time window 245 to allow for correlation of additional events occurring within the third time window. Because no additional events occurred within the third time window (or at least no additional events occurred within the time window that also matched the correlation rule and/or the topology), the hypothesis is closed at the end of the third time window and no subsequently occurring events are considered in the hypothesis. Having closed the hypothesis, the cause identification module can identify a cause of Events 1-3 based on the hypothesis. Event 4 occurs after Event 3 and after the third time window has elapsed, so even though Event 4 can be described by the same correlation rule as the previous three events, Event 4 is not considered in the hypothesis related to the previous three events. Instead a new hypothesis 250 can be created and the process can begin anew. The system may be configured to manage correlation of multiple events or chains of events which at a same or substantially the same time regardless of a degree of correlation among particular events or chains of events. In other words the system may correlate a series of events to create a first chain of events while during an overlapping time frame also correlating a different series of events to create a second chain of events which may be separate from the first chain of events. In one aspect, the system may be further configured to analyze multiple separate or uncorrelated chains of events to determine whether a higher level correlation rule applies to correlate the chains of events.

Figure 3:
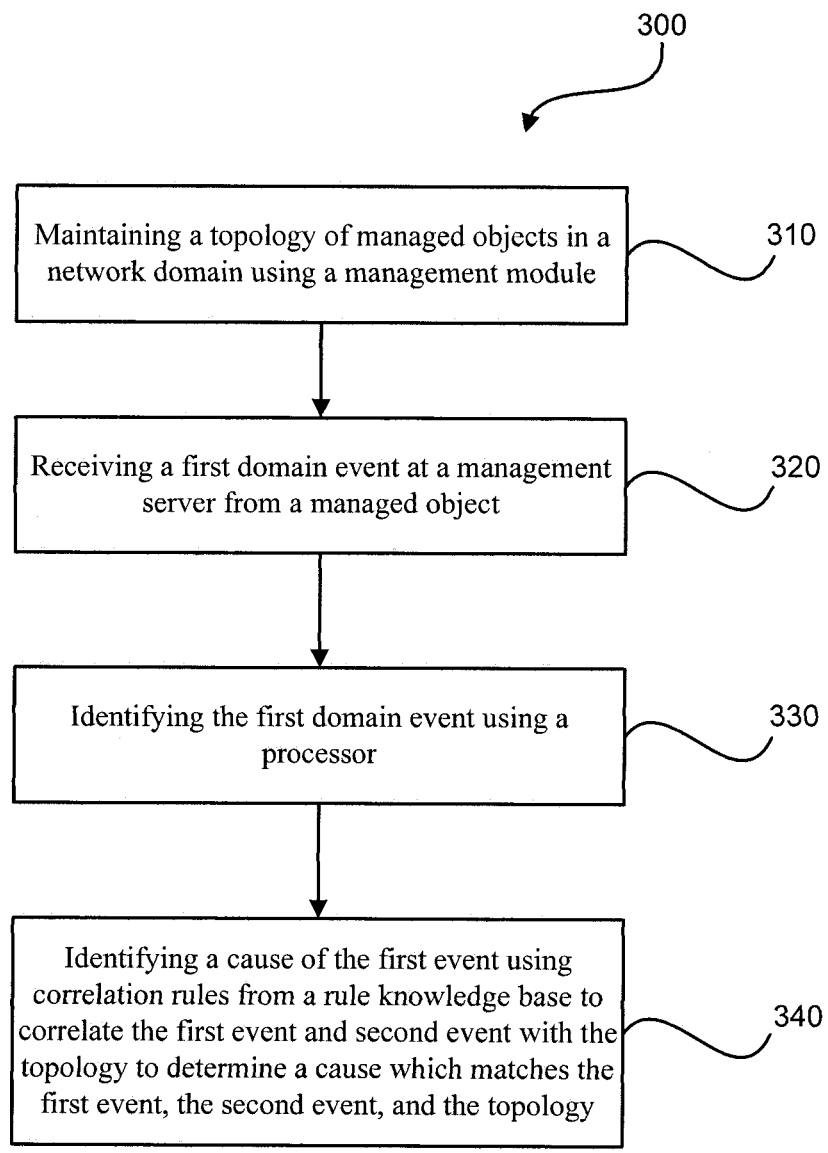
FIG. 3 is a flow diagram of a method for dynamically identifying and correlating network domain events in accordance with an embodiment.

Referring now to FIG. 3, a method 300 is shown for dynamically identifying and correlating network domain events, in accordance with an embodiment. A topology of managed objects in a network domain can be maintained 310 using a management module. A first domain event can be received 320 at a management server from a managed object. The first domain event can be identified 330 using a processor and a cause of the first event can be identified 340 using correlation rules from a rule knowledge base and in view of the topology. The correlation rules can provide definitions regarding which event types or event identifications to correlate based on available topology information. Events can be correlated to determine a cause of the events which matches the first event, the second event, and the topology.

The method can further include associating the first event with a second event when the first event and second event occur within a predetermined time frame. An interdependent source graph of the topology related to the first event and the second event can also be built. The interdependent source graph can be navigated to locate a root cause underlying the cause(s) of the first and second events. In one aspect, identifying the cause of the first event and the second event can further include performing cross-domain event correlation across multiple domains using the topology and the correlation rules to identify a specific cause of a domain event in a specific network domain. Correlation rules for cross-domain event correlation can be amended by amending correlation rules for specific network domains.

The method can further include creating a hypothesis regarding a domain event cause. The hypothesis can have an initial time window that begins when a first domain event matching a correlation rule is received by the management server. A second domain event can be added to the hypothesis (e.g., correlated with the first event) when: the second event matches the correlation rule; the second event is received by the management server within the initial time window; and the topology between the first domain event and the second domain event matches. When the second domain event is added to the hypothesis, the initial time window can be extended to create an extended time window. The hypothesis can be closed if the second domain event is not received by the management server before the initial time window has elapsed.

Various additional features and details of the system and method will now be described. The event-correlation can overlay two models at runtime. One model is a causal model. The causal model can define a graph of cause-symptom relations between events that occur on types of managed objects. This model is complemented by a second model. The second model can be a topology model that represents an actual IT environment. The topology model can be an instantiation of the object types used in the causal model. Rather than having a dedicated topology store as a part of the correlation engine, the topology can be consumed from a CMDB. The CMDB may already be a part of a customer's IT management solution. The reuse of the CMDB means that the customer does not need to maintain duplicate models of the IT environment. Also, the CMDB can provide the correlation system with a powerful modeling tool in terms of object typing, type inheritance, as well as strong query capabilities. Although the topology store has been primarily described as a CMDB herein, other topology stores may also be used which support object and relationship typing.

A correlation runtime can implement a sequence of processing steps for the incoming events. These steps can include CI resolution, ETI assignment, correlation, etc. The CI resolution step can relate events to CIs that are stored in the CMDB. In this step, event properties can be analyzed to find identifiers (such as IP/MAC (Internet Protocol/Media Access Control) addresses of nodes, SIDs (System Identifiers) of databases, etc.). The identifiers can be compared with CI properties to rate the level of identifier match, and a best-matching CI can be found without any configuration by a customer. The ETI assignment step can be completed as described in the event conversion process described above.

The event correlation step can be performed on the CI- and ETI-related information associated with events. If CI or ETI resolution does not associate any relevant information with an event, that event may not be correlated and can remain as a standalone event. A correlation engine can process cause-symptom relations based on CI types and ETI values. The correlation engine can associate the CI instance and ETI value associated with events with matching cause-symptom relations until both the cause and any symptoms are observed within a configured time frame. These cause-symptom relations occurring within the configured time frame can represent the causal model described above. Topology constraints of the causal model relationships can be checked in the CMDB. In the event of a positive match, a causal relation can be established between the symptom and cause events. For example, if an event for logical volume 'LV42' with ETI 'Quota'='exceeded', and another event for table space 'TS 1108' with ETI 'Status'='ExtendFailed' both occur within the same timeframe, these events can be linked if the CMDB provides information that table space 'TS 1108' is configured to store data into logical volume 'LV42'.

The correlation system has the ability to relate cause and symptom events in multiple layers to linking events across multiple application domains. An event that is determined as the cause of some symptoms can be found to be the symptom of another cause. Linking events in this manner can lead to an actual, underlying root cause of many symptoms on different levels.

The correlation system can include a graphical user interface (GUI) for displaying the interdependent source graph, which may be a tree of managed objects and associated relationships. The GUI can be used in a variety of other ways for investigating causal relationships between events. For example, the GUI may display an event browser. The event browser may display a root cause, such as a storage 'quota exceeded' event. A 'details' screen can show a hierarchy of related symptom events. The storage-quota problem may be the cause of a table space problem, which in turn may be the cause of a reduction in the performance of a web application. The system can be configured such that when a user closes a root cause event, all correlated symptoms are closed automatically. The user does not need to work on the symptom events separately when the symptom events are all caused by the same root problem. The GUI can also be used to hide complexity of a causal configuration language by allowing domain experts to create correlation rules in an intuitive manner.

Domain experts can set up relationships between cause and symptom events for specific application domains and the correlation engine can automatically perform cross-domain correlation across the entire causal model. This can be enabled by using a common CI model and associated ETI definitions which are shared by connected network domains. For example, a storage management program can extend the CI type model of the CMDB to provide storage infrastructure elements below a 'Logical Volume' and define Event Type Indicators for SAN (Storage Area Network) devices as the cause of the above-described 'quota exceeded' ETI of the 'Logical Volume' without the involvement of the database domain expert who had defined earlier how table space ETIs depend on the underlying 'Logical Volume'.

Leveraging the typed model from the CMDB and using ETIs, rule designers can relate symptoms and causes within a CI-type model. Designers can concentrate on a specific domain and without considering the complete cause-symptom model. Thus, a designer can contribute knowledge efficiently. The complete causal model can evolve from the connection between symptoms and causes in different rules, which can span multiple domains. In one example, a correlation rule defines a quota-exceeded problem as the cause for an extend-table space problem if the table space depends on that logical volume. A second correlation rule defines an extend-table space problem as the cause for a problem with poor web application performance. Because of a cause-symptom overlap between these rules in using a same table space, the user can navigate through the causal model using the GUI.

The methods and systems of certain embodiments may be implemented in hardware, software, firmware, or combinations thereof. In one embodiment, the method can be executed by software or firmware that is stored in a memory and that is executed by a suitable instruction execution system. If implemented in hardware, as in an alternative embodiment, the method can be implemented with any suitable technology that is well known in the art.

The various engines, tools, or modules discussed herein may be, for example, software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, and the like.

It will also be appreciated that one or more of the elements depicted in the drawings/figures can also be implemented in a more separated or integrated manner, or even removed or rendered as inoperable in certain cases, as is useful in accordance with a particular application.

Also within the scope of an embodiment is the implementation of a program or code that can be stored in a machine-readable medium to permit a computer to perform any of the methods described above.

Additionally, the signal arrows in the Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Various functions, names, or other parameters shown in the drawings and discussed in the text have been given particular names for purposes of identification. However, the functions, names, or other parameters are only provided as some possible examples to identify the functions, variables, or other parameters. Other function names, parameter names, etc. may be used to identify the functions, or parameters shown in the drawings and discussed in the text.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A system for dynamically identifying and correlating network domain events, comprising:
a plurality of managed objects in a network domain;
a management server in communication with the managed objects, the management server being configured to receive domain events from at least one of the managed objects;
a management module on the management server configured to maintain a topology of managed objects in the network domain;
a rule knowledge base in communication with the management server, the rule knowledge base comprising correlation rules for identifying and correlating domain events;
a correlation module configured to utilize a processor to correlate the domain events with the topology using the correlation rules to identify an interaction between the managed objects and the domain events; and
a hypothesis module configured to create a hypothesis regarding a cause of a first domain event based on a corresponding correlation rule and generate a time window based on the hypothesis, wherein the time window is used to monitor future domain events that occur within the time window.

2. A system in accordance with claim 1, further comprising a cause identification module configured to determine causes of the domain events based on the interaction between the managed objects and the domain events.

3. A system in accordance with claim 2, wherein the cause identification module is further configured to correlate a plurality of domain event causes to identify a root cause.

4. A system in accordance with claim 1, further comprising a timing module configured to associate a plurality of domain events when the plurality of domain events occurs within a predetermined time frame.

5. A system in accordance with claim 4, wherein the hypothesis module is configured to:
    create an initial time window when the first domain event matching a correlation rule is received by the management server and to add a second domain event to the hypothesis when:
        the second domain event matches the correlation rule;
        the second domain event is received by the management server within the initial time window; and
        the topology between the first domain event and the second domain event matches;
    extend the initial time window to create an extended time window when the second domain event is added to the hypothesis; and
    close the hypothesis if the second domain event is not received by the management server before the initial time window has elapsed.

6. A system in accordance with claim 1, further comprising a conversion module on the management module, the conversion module being configured to convert domain events of various formats into a uniform event indicator format.

7. A system in accordance with claim 6, wherein the conversion module further comprises an event resolution module configured to analyze domain event properties and compare the domain event properties with uniform event indicators in an event conversion database to find a best-matching uniform event indicator when a perfect-matching uniform event indicator is not available.

8. A system in accordance with claim 1, wherein the network domain comprises a plurality of connected network domains.

9. A system in accordance with claim 8, wherein the topology and the rule knowledge base encompass the plurality of connected network domains.

10. A system in accordance with claim 1, wherein the management module comprises a Configuration Management Database (CMDB).

11. A system in accordance with claim 1, wherein the correlation module is configured to correlate domain events based on domain event occurrence information.

12. A system in accordance with claim 1, further comprising a correlation rule automation module configured to analyze domain event logs to detect clusters of domain events which repeatedly occur together to automate definition of the correlation rules.

13. A method for identifying and correlating domain events, comprising:
    maintaining a topology of managed objects in a network domain using a management module;
    receiving a first domain event at a management server from a managed object;
    identifying the first domain event using a processor;
    identifying a cause of the first domain event using correlation rules from a rule knowledge base to correlate the first domain event and a second domain event with the topology to determine the cause that matches the first domain event, the second domain event, and the topology; and
    create a hypothesis regarding the cause of the first domain event based on a corresponding correlation rule and create a time window based on the hypothesis, wherein the time window is used to monitor future domain events that occur within the time window.

14. A method in accordance with claim 13, further comprising associating the first domain event with the second domain event when the first domain event and the second domain event occur within a predetermined time frame.

15. A method in accordance with claim 13, further comprising building an interdependent source graph of the topology related to the first domain event and the second domain event.

16. A method in accordance with claim 15, further comprising navigating the interdependent source graph to locate a root cause underlying the cause of the first domain event and the second domain event.

17. A method in accordance with claim 13, wherein identifying the cause of the first domain event and the second domain event further comprises performing cross-domain event correlation across multiple domains using the topology and the correlation rules to identify a specific cause of a domain event in a specific network domain.

18. A method in accordance with claim 17, further comprising amending correlation rules for cross-domain event correlation by amending correlation rules for the specific network domain.

19. A method in accordance with claim 13, further comprising:
    creating an initial time window when the first domain event matching a correlation rule is received by the management server and to add the second domain event to the hypothesis when:
        the second domain event matches the correlation rule;
        the second domain event is received by the management server within the initial time window; and
        the topology between the first domain event and the second domain event matches;
    extending the initial time window to create an extended time window when the second domain event is added to the hypothesis; and
    closing the hypothesis if the second domain event is not received by the management server before the initial time window has elapsed.

20. A system for dynamically identifying and correlating network domain events across a plurality of network domains, comprising:
    a plurality of network domains;
    a plurality of managed objects in the plurality of network domains;
    a management server in communication with the managed objects, the management server being configured to receive domain events from at least one of the managed objects;
    a conversion module on the management module, the conversion module being configured to convert domain events of various formats into a uniform event type indicator;
    a management module on the management server configured to create a topology model of managed objects in the plurality of network domains;

a rule knowledge base in communication with the management server, the rule knowledge base comprising correlation rules for identifying and correlating domain events;
a correlation module configured to utilize a processor to correlate the domain events with the topology using the correlation rules to identify an interaction between the managed objects and the domain events;
a cause identification module configured to determine a cause of the domain events based on the interaction between the managed objects and the domain events; and
a hypothesis module configured to create a hypothesis regarding the cause of a first domain event based on a corresponding correlation rule and generate a time window based on the hypothesis, wherein the time window is used to monitor future domain events that occur within the time window.

* * * * *